July 28, 1959  J. H. HEIMAN, JR  2,896,409
ROTARY ENGINE
Filed Sept. 9, 1958  4 Sheets-Sheet 1
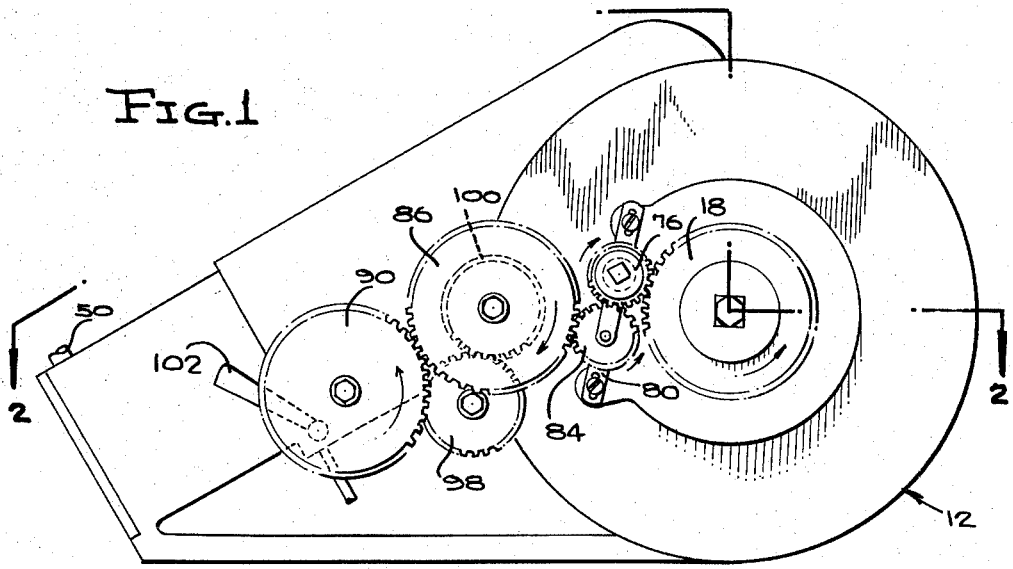
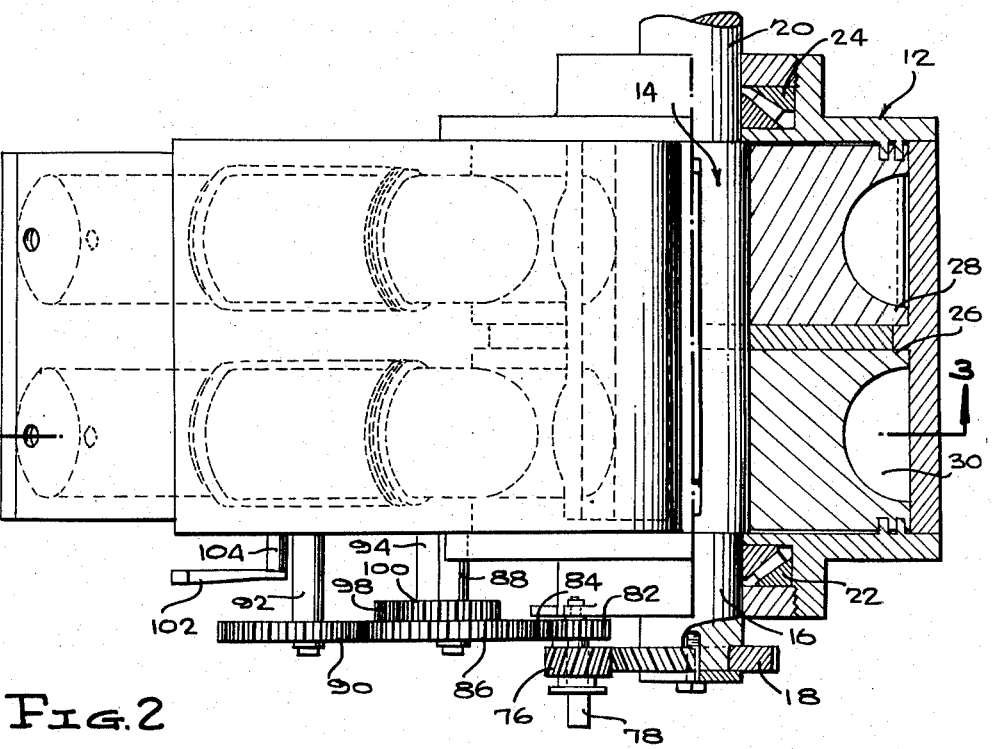
INVENTOR.
JOHN H. HEIMAN, Jr.
BY
McMorrow, Berman & Davidson
ATTORNEYS

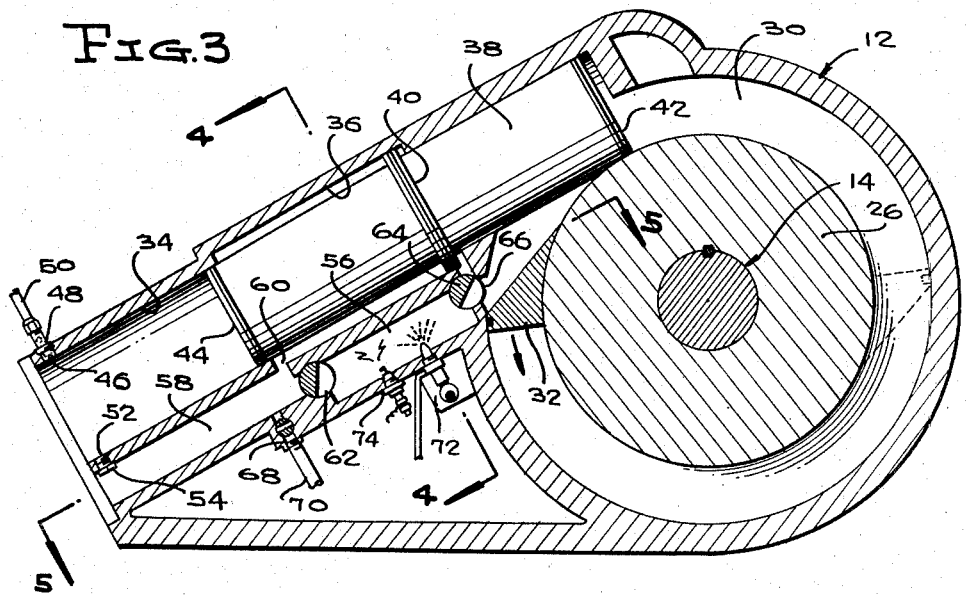

July 28, 1959   J. H. HEIMAN, JR   2,896,409
ROTARY ENGINE

Filed Sept. 9, 1958   4 Sheets-Sheet 3

INVENTOR.
JOHN H. HEIMAN, Jr.
BY
McMorrow, Berman & Davidson
ATTORNEYS

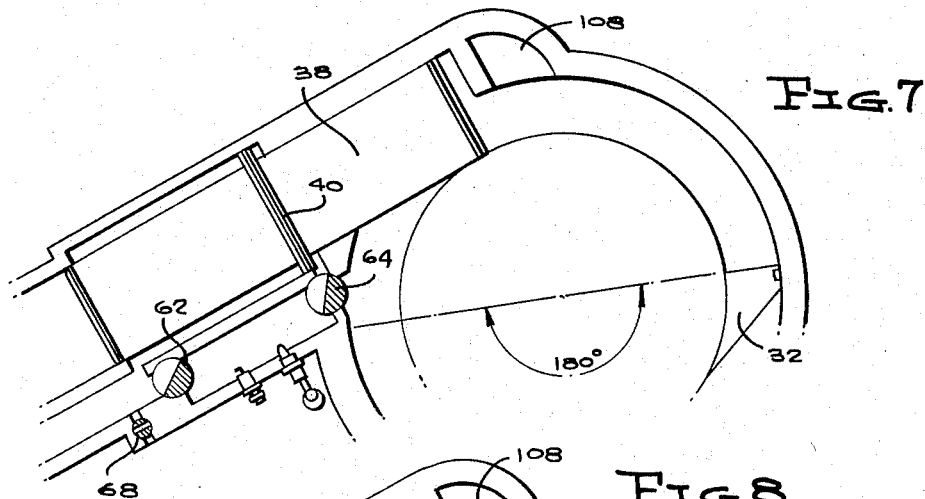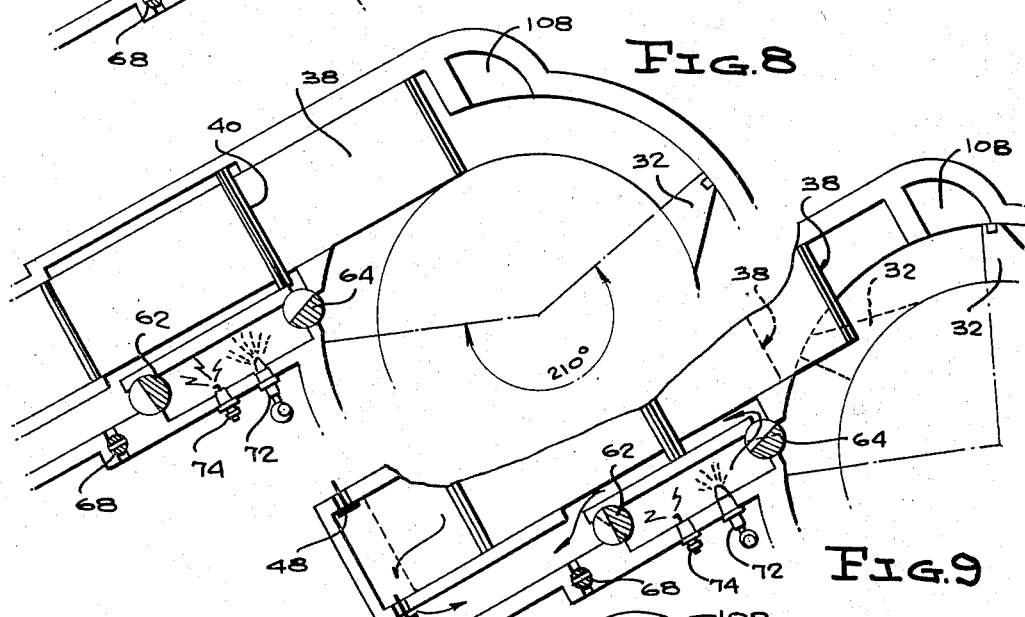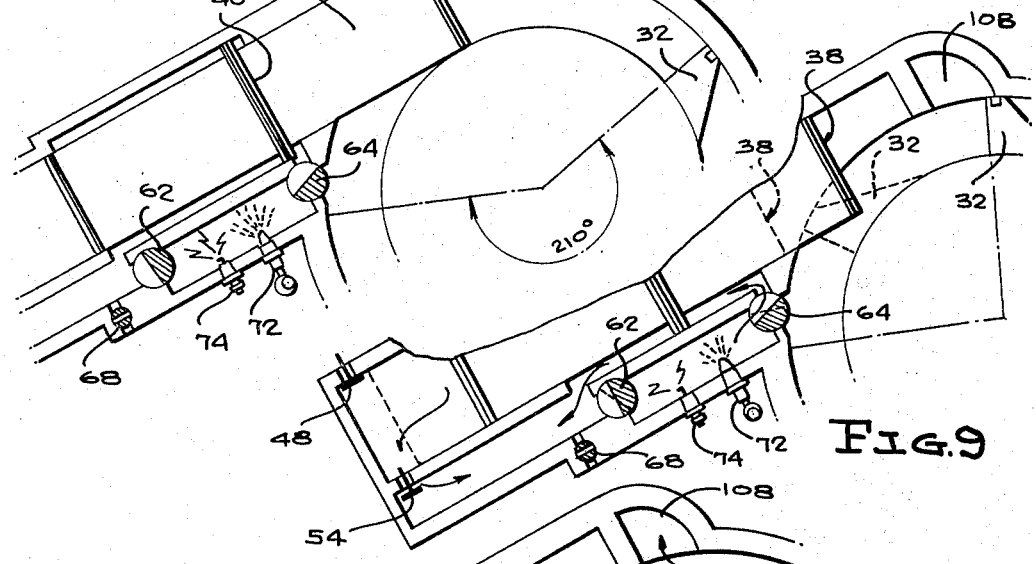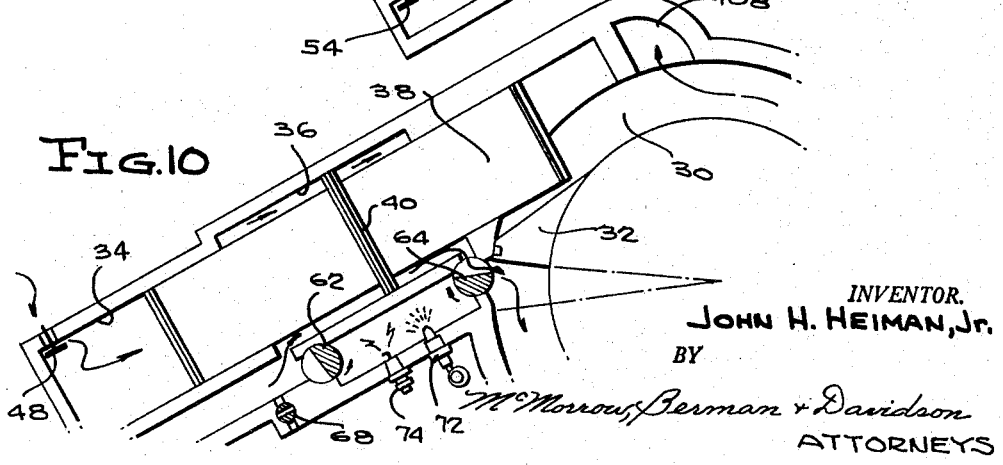

United States Patent Office 2,896,409
Patented July 28, 1959

2,896,409

ROTARY ENGINE

John H. Heiman, Jr., Kansas City, Mo.

Application September 9, 1958, Serial No. 760,043

9 Claims. (Cl. 60—39.61)

The present invention relates to rotary engines generally and in particular to a rotary internal combustion engine.

Rotary internal combustion engines presently in use or heretofore contemplated have employed a closed chest having a rotor rotatably mounted therein, a piston mounted on the rotor traveling in an annular passage or groove, and means slidably mounted in the chest for opening and closing the groove to permit traveling movement of the piston. Such engines have employed swinging vanes, sliding blocks, rotating plates, and the like, for groove opening and closing means, each connected mechanically to the rotor. The driving force for such means is, therefore, derived from the rotor and the power output of the engine is diminished by the driving force used to drive the groove opening and closing means.

Accordingly, an object of the present invention is to provide a rotary internal combustion engine which has means opening and closing the groove which is operated by means other than the driving force derived from the rotor.

Another object of the present invention is to provide a rotary internal combustion engine in which the driving force derived from the explosion of a combustible fuel mixture actuates the rotor and means opening and closing the groove.

A further object of the present invention is to provide a rotary engine which lends itself to smooth, positive displacement action and variable compression operation throughout its range of operating speed.

A still further object of the present invention is to provide a rotary internal combustion engine which may be constructed of any desired number of rotors.

Yet another object of the present invention is to provide a rotary internal combustion engine which is efficient in action, which uses slow burning inexpensive fuels, and one which is economically feasible.

These and other objects and advantages of the present invention will be fully apparent from the following description when taken in conjunction with the annexed drawings, in which:

Figure 1 is an elevational view of the rotary internal combustion engine of the present invention;

Figure 2 is a view taken on the line 2—2 of Figure 1;

Figure 3 is a view taken on the line 3—3 of Figure 2;

Figure 4 is a view taken on the line 4—4 of Figure 3 and on an enlarged scale;

Figure 7 is a view similar to Figure 6, showing the rotor advanced in its cycle of revolution;

Figure 8 is a schematic view showing the position of the rotor at the instant of firing of the fuel charge in the combustion cylinder;

Figure 9 is a schematic view showing the rotor further rotated and the piston at the start of its reciprocatory movement, the dotted line showings indicating the path of movement of the rotor piston and piston relative to each other; and Figure 10 is a schematic view showing the return stroke of the piston and exhausting of the piston chamber.

Figure 5:
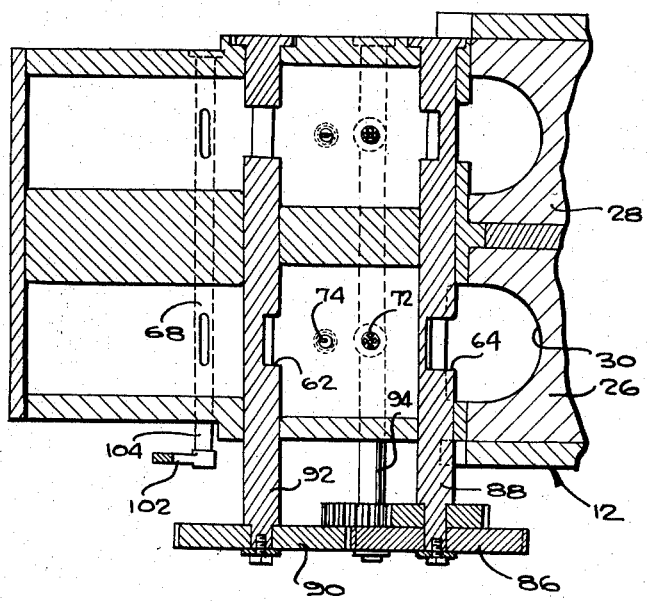
Figure 5 is a view taken on the line 5—5 of Figure 3.

Referring in greater detail to the drawings in which like numerals indicate like parts throughout the several views, the rotary internal combustion engine of the present invention comprises a closed chest 12 having a rotatable shaft 14 mounted transversely therein with portions of the shaft projecting exteriorly of both sides of the chest 12. One projecting shaft portion 16 carries a main drive gear 18 and the other projecting shaft portion 20 is adapted for connection to a machine to be driven. Suitable bearing assemblies 22 and 24 support the shaft 14 in the chest 12, as shown in Figure 2.

A pair of rotors 26 and 28 are secured to the shaft 14 within the chest 12 for rotation with the shaft 14. As the rotors 26 and 28 are identical, they will be described with reference to the rotor 26.

The rotor 26 is provided with a semicircular groove 30 extending completely around the periphery thereof. The rotor 26 is provided with a piston 32 bridging the groove 30 and fixedly carried by the rotor 26.

The chest 12 is provided with a cylindrical piston chamber 34 having an enlarged portion 36 centrally thereof, the chamber 34 being arranged tangentially with respect to the groove 30 and having part of one end in communication with the groove 30. An abutment or a double-end piston 38 having a projecting piston ring 40 extending about its midportion slides in the chamber 34 with the ring slidable in the enlarged portion 36. The piston 38 is slidable within the chamber 34 from a position shown in Figure 3 in which the end 42 is within the groove 30, or partially within the groove 30, to a position in which the end 44 is adjacent to and spaced from the end of the chamber 34 having an inlet opening 46. A check valve 48 is in the inlet opening 46 and the opening 46 is connected by a conduit 50 to a source of air under pressure. In the wall of the chamber 34 opposite to the inlet opening 46 is an outlet 52 having a check valve structure 54 therein.

The chest 12 is provided with a combustion chamber 56 contiguous to the piston chamber 34. The outlet 52 from the piston chamber 34 leads to a first or compression passageway 58 having one end connected in communication with one end of the combustion chamber 56. The same end of the passageway 58 is also connected in communication with the space around the abutment piston 38 within the enlarged portion 36 of the chamber 34. This connection of the one end of the passageway 58 with the aforesaid space is designated in Figure 3 by the numeral 60.

A first rotary valve 62 is in the end of the passageway 58 connected in communication with the combustion chamber 56. A second rotary valve 64 is at the other end of the combustion chamber 56 in a three-way passageway which connects the interior of the combustion chamber 56 with the space between the abutment piston 38 and the enlarged portion 36 of the chamber 34 on the other side of the ring 40 from the connection 60 of the passageway 58 with such space. The second passageway, designated by the numeral 66, in which the valve 64 operates also connects the adjacent end of the combustion chamber 56 with the groove 30 at a point adjacent to the part of the abutment piston 38 which projects into the groove 30 when the abutment piston is in the groove-closing position.

Another rotary valve 68 connects the interior of the passageway 58 with the atmosphere by means of a conduit 70, only a portion of the conduit 70 being shown in Figure 3 for reasons of simplification.

Fuel injection means, embodying a pump and nozzle assembly 72 of conventional construction, is in communication with the interior of the combustion chamber 56 for introducing a charge of fuel under pressure into such combustion chamber.

A glow plug 74 or other ignition means is in communication with the interior of the combustion chamber 56 for the purpose of igniting the charge of fuel when introduced by the pump and nozzle assembly 72.

Referring to Figures 1, 2, and 5, it will be seen that the gear 18 on the shaft portion 16 is in mesh with an idler gear 76 carried by a stub shaft 78 which is rotatably mounted exteriorly of the chest 12 on a strap support member 80. Another gear 82 is fixedly secured to the stub shaft 78 and is in meshing engagement with a reversing gear 84. The gear 84 is in meshing engagement with a large pinion gear 86 carried on the free projecting end portion 88 of the rotary valve 64. Another gear 90 is in mesh with the gear 86 and is fixedly carried on the projecting end portion 92 of the rotary valve 62.

A rotatable shaft 94 has its ends extending through the outer walls of the chest 12 and carries cams 96 which operate the pump and nozzle assemblies 72 responsive to rotation of the shaft 94. A gear 98 is carried on the projecting end portion of the shaft 94 adjacent the gear 86 and is in meshing engagement with a reduced gear 100 carried by the rotary valve portion 88.

An operating handle 102 is connected to the projecting end portion 104 of the valve 68. A conduit for fuel, as at 106 in Figure 4, supplies each of the nozzles of the pump and nozzle assemblies 72 with fuel from a source of fuel under pressure.

In operation, at the start of a cycle of operation, as shown in Figure 3, the valve 62 is closed and the valve 64 is open. The rotor piston 32 is forced in the direction of the arrow by combustion gases escaping through passageway 66. Air under constant pressure flows through the inlet opening 46 into the piston chamber 34 and into the compression passageway 58 and, by reason of the connection 60, into the space on one side of the ring 40. This pressure holds the abutment piston 38 in one end of the chamber 34 with a part of the abutment piston 38 projecting into and closing the groove 30.

Figure 6:
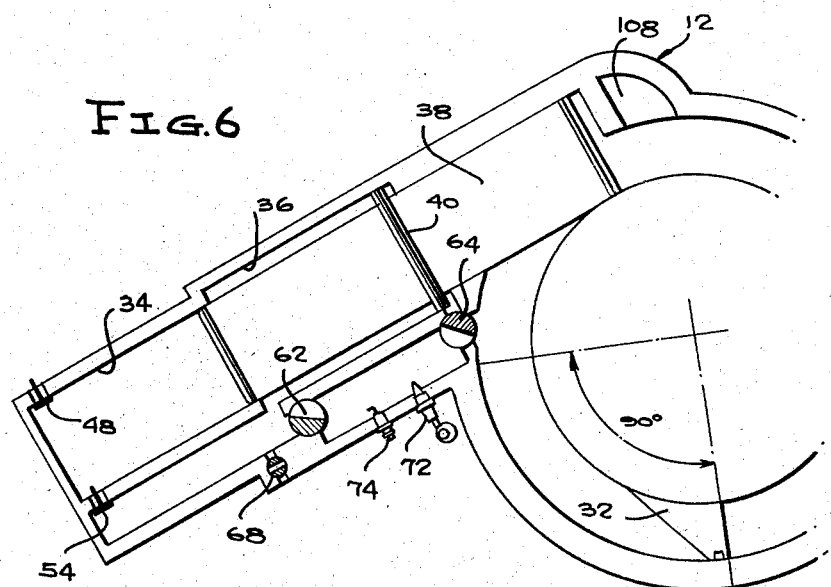
Figure 6 is a schematic view showing the rotor 90 degrees past the beginning of a cycle of revolution of the rotor in one-half of the engine.

In Figure 6, the rotor has advanced 90 degrees in the counterclockwise direction and the valve 64 is approaching its rotational position closing the communication between the combustion chamber 56 and the groove 30, while the valve 62 is in its position just prior to opening.

In Figure 7, the valve 64 has been rotated to the position connecting the space in the enlarged portion 36 of the piston chamber 34 with the combustion chamber 56 and the rotor has advanced another 90 degrees. A charge of air has been admitted to the combustion chamber 56 through the valve 62 which is shown in Figure 7 to have just moved to the closed position.

Next, in Figure 8, fuel is admitted under pressure through the nozzle of the pump and nozzle assembly 72 into the combustion chamber 56 and has been ignited by the glow plug 74. The valve 62 is closed and the valve 64 is in the position admitting the burning gases into the enlarged portion 36 of the chamber 34 on the right hand side of the ring 40.

In Figure 9, the rotor has advanced in the counterclockwise direction and explosive gases are shown by the arrows moving into the space defined by the piston and enlarged portion 36 of the chamber 34, exerting pressure on the ring 40 to shift the abutment piston 38 toward the end of the chamber 34 remote from the groove 30. The dotted line showings in Figure 9 indicate the next advanced position of the rotor piston 32 and the abutment piston 38 with dotted lines showing the next corresponding positions of the valves 62 and 64.

In Figure 10, valves 64 and 62 have been moved to the closed position. The pressure within the compression passageway 58 passes through 60 to exert a force upon the ring 40 to move the abutment piston 38 to the right to the position in which the end part of the abutment piston 38 enters and seals the groove 30. The pressure on the opposite side of the piston ring 40 is now being exhausted from the area 36 on the side adjacent to the rotor into the groove 30 in the rotor 26. An exhaust port 108 is provided in the chest 12 and is in communication with the groove 30 at a point around the periphery of the groove 30 remote from the valve 64.

As the rotor piston 32 advances, the spent combustion gases are exhausted through the port 108.

Control of the engine may be accomplished by control of the fuel flowed to the fuel injector means and also by adjusting the valve 68 to a partially open or open position limiting the pressure of the compressed air within the compression passageway 58. It is to be understood that air under pressure is supplied to the inlet opening 46 with the degree of pressure dependent upon various considerations to be taken into account during the construction of the engine. The pressure in the chamber 34 should be sufficient to cause the abutment piston 38 to move to the position in which a part thereof closes the groove 30 but should be less than the pressure of the combustion product flowing into the space on the side of the piston ring 40 adjacent the groove 30 when the valve 64 has been moved to the appropriate open position permitting such passage of combustion gases. Additionally, the interval of ignition and the amount of fluid fuel introduced to the combustion chamber should be adjusted to the point where rotative forces acting upon the piston 32 effect the rotation of the rotor 26 a rotational distance sufficient to have inertia to travel through the fraction of rotational cycle passing the retracted part of the piston 38 prior to the initiation of a new cycle of operation.

With at least two rotors 26 and 28 enclosed within the chest 12, the flow of power from the engine will be smooth for the reason that the rotor pistons 32 will be placed at one hundred eighty degrees from each other. When more than two rotors are used in the engine of the present invention, the rotor pistons will be arranged at equidistant points about their rotation of movement so that power impulses applied to such rotor pistons will be in sequence from one rotor to another.

What is claimed is:

1. In a rotary engine, a closed chest, a shaft to be rotatably mounted in said chest, a rotor secured to said shaft for rotation therewith, said rotor being provided with a groove extending completely about the periphery thereof, a piston bridging said groove and carried by said rotor, a cylindrical piston chamber within said chest and arranged tangentially with respect to said groove and having part of one end in communication with said groove, an abutment piston working within said chamber and slidable in said chamber, a combustion chamber within said chest and contiguous to said piston chamber, means connected in communication with said piston chamber adjacent the other end thereof for admitting air under pressure to said piston chamber, a first passageway connecting said piston chamber with one end of said combustion chamber, a check valve connected in communication with the portion of said piston chamber adjacent the other end for controlling the flow of air under pressure from said piston chamber into said passageway, a second passageway connecting said combustion chamber to said one end of said piston chamber and to said groove, an outlet from said groove, a first rotary valve in said first passageway for controlling the flow of air under pressure from said first passageway into said combustion chamber, and a second rotary valve in said second passageway for controlling the flow of combustion gases from said combustion chamber to said one end of said piston chamber.

2. In a rotary engine, a closed chest, a shaft to be rotatably mounted in said chest, a rotor secured to said shaft for rotation therewith, said rotor being provided with a groove extending completely about the periphery thereof, a piston bridging said groove and carried by said rotor, a cylindrical piston chamber within said chest and arranged tangentially with respect to said groove and having part of one end in communication with said groove, an abutment piston working within said chamber and slidable in said chamber, a combustion chamber within said chest and contiguous to said piston chamber, means connected in communication with said piston chamber adjacent the other end thereof for admitting air under pressure to said piston chamber, a first passageway connecting said piston chamber with one end of said combustion chamber, a check valve connected in communication with the portion of said piston chamber adjacent the other end for controlling the flow of air under pressure from said piston chamber into said passageway, a second passageway connecting said combustion chamber to said one end of said piston chamber and to said groove, an outlet from said groove, a first rotary valve in said first passageway for controlling the flow of air under pressure from said first passageway into said combustion chamber, a second rotary valve in said second passageway for controlling the flow of combustion gases from said combustion chamber to said one end of said piston chamber, a fuel injection means in communication with the interior of said combustion chamber for introducing a charge of fuel under pressure into said chamber, and an igniting means in communication with the interior of said combustion chamber for igniting the charge of fuel introduced into said combustion chamber.

3. In a rotary engine, a closed chest, a shaft to be rotatably mounted in said chest, a rotor secured to said shaft for rotation therewith, said rotor being provided with a groove extending completely about the periphery thereof, a piston bridging said groove and carried by said rotor, a cylindrical piston chamber within said chest and arranged tangentially with respect to said groove and having part of one end in communication with said groove, an abutment double piston working within said chamber and slidable in said chamber, a combustion chamber within said chest and contiguous to said piston chamber, means connected in communication with said piston chamber adjacent the other end thereof for admitting air under pressure to said piston chamber, a first passageway connecting said piston chamber with one end of said combustion chamber, a check valve connected in communication with the portion of said piston chamber adjacent the other end for controlling the flow of air under pressure from said piston chamber into said passageway, a second passageway connecting said combustion chamber to said one end of said piston chamber and to said groove, an outlet from said groove, a first rotary valve in said first passageway for controlling the flow of air under pressure from said first passageway into said combustion chamber, and a second rotary valve in said second passageway for controlling the flow of combustion gases from said combustion chamber to said one end of said piston chamber.

4. In a rotary engine, a closed chest, a shaft to be rotatably mounted in said chest, at least two rotors arranged in end to end relation secured to said shaft for rotation therewith, each of said rotors being provided with a groove extending completely about the periphery thereof, a piston bridging each groove and carried by the adjacent rotor, a cylindrical piston chamber within said chest and arranged tangentially with respect to each of said grooves and having a part of one end in communication with said groove, an abutment piston working within each of said chambers and slidable in said chambers, a combustion chamber within said chest and contiguous to each of said piston chambers, means connected in communication with each of said piston chambers adjacent the other end thereof for admitting air under pressure to said piston chambers, a first passageway connecting each of said piston chambers with one end of the adjacent combustion chamber, a check valve connected in communication with the portion of each piston chamber adjacent the other end for controlling the flow of air under pressure from the adjacent piston chamber into said passageway, a second passageway connecting each of said combustion chambers to said one end of the adjacent piston chamber and to the adjacent groove, an outlet from each of said grooves, a first rotary valve in each of said first passageways for controlling the flow of air under pressure from said first passageway into the adjacent combustion chamber, and a second rotary valve in each of said second passageways for controlling the flow of combustion gases from the adjacent combustion chamber to said one end of the adjacent piston chamber.

5. In a rotary engine, a closed chest, a shaft to be rotatably mounted in said chest, at least two rotors arranged in end to end relation secured to said shaft for rotation therewith, each of said rotors being provided with a groove extending completely about the periphery thereof, a piston bridging each groove and carried by the adjacent rotor, a cylindrical piston chamber within said chest and arranged tangentially with respect to each of said grooves and having a part of one end in communication with said groove, an abutment piston working within each of said chambers and slidable in each of said chambers, a combustion chamber within said chest and contiguous to each of said piston chambers, means connected in communication with each of said piston chambers adjacent the other end thereof for admitting air under pressure to said piston chambers, a first passageway connecting each of said piston chambers with one end of the adjacent combustion chamber, a check valve connected in communication with the portion of each piston chamber adjacent the other end for controlling the flow of air under pressure from the adjacent piston chamber into said passageway, a second passageway connecting each of said combustion chambers to said one end of the adjacent piston chamber and to the adjacent groove, an outlet from each of said grooves, a first rotary valve in each of said first passageways for controlling the flow of air under pressure from said first passageway into the adjacent combustion chamber, a second rotary valve in each of said second passageways for controlling the flow of combustion gases from the adjacent combustion chamber to said one end of the adjacent piston chamber, a fuel injection means in communication with the interior of each of said combustion chambers for introducing a charge of fuel under pressure into said chamber, and an igniting means in communication with the interior of each of said combustion chambers for igniting the charge of fuel introduced into said combustion chamber.

6. In a rotary engine, a closed chest, a shaft to be rotatably mounted in said chest, a rotor secured to said shaft for rotation therewith, said rotor being provided with a groove extending completely about the periphery thereof, a piston bridging said groove and carried by said rotor, a cylindrical piston chamber within said chest and arranged tangentially with respect to said groove and having part of one end in communication with said groove, an abutment piston working within said chamber and slidable in said chamber, a combustion chamber within said chest and contiguous to said piston chamber, said piston chamber being provided with air admitting means, means connecting said piston chamber with said combustion chamber, an outlet from said groove, and means connecting said combustion chamber to said one end of said piston chamber and to said groove.

7. In a rotary engine, a closed chest, a shaft to be rotatably mounted in said chest, a rotor secured to said shaft for rotation therewith, said rotor being provided with a groove extending completely about the periphery thereof, a piston bridging said groove and carried by said rotor, a cylindrical piston chamber within said chest and arranged tangentially with respect to said groove and having part of one end in communication with said groove, an abutment piston working within said chamber and slidable in said chamber, a combustion chamber within said chest and contiguous to said piston chamber, said piston chamber being provided with air admitting means, a valve controlled means connectng said piston chamber with said combustion chamber, an outlet from said groove, and valve controlled means connecting said combustion chamber to said one end of said piston chamber to said groove.

8. In a rotary engine, a closed chest, a rotatable rotor, said rotor being provided with a groove extending completely about the periphery thereof, a piston bridging said groove and carried by said rotor, a cylindrical piston chamber within said chest and arranged so that a part of one end is in communication with one end of said groove, an abutment piston working within said chamber and slidable in said chamber, a combustion chamber within said chest and contiguous to said piston chamber, said piston chamber being provided with air admitting means, means connectng said piston chamber with said combustion chamber, an outlet from said groove, and means connecting said combustion chamber to said one end of said piston chamber and to said groove.

9. In a rotary engine, a closed chest, a rotatable rotor, said rotor being provided with a groove extending completely about the periphery thereof, a piston bridging said groove and carried by said rotor, a cylindrical piston chamber within said chest and arranged so that a part of one end is in communication with one end of said groove, an abutment piston working within said chamber and slidable in said chamber, a combustion chamber within said chest and contiguous to said piston chamber, said piston chamber being provided with air admitting means, a valve controlled means connecting said piston chamber with said combustion chamber, an outlet from said groove, and valve controlled means connecting said combustion chamber to said one end of said piston chamber and to said groove.

References Cited in the file of this patent

UNITED STATES PATENTS

| | | |
|---|---|---|
| 907,023 | Fitch | Dec. 15, 1908 |
| 1,106,997 | Walker | Aug. 11, 1914 |
| 1,294,834 | Rothweiler | Feb. 18, 1919 |
| 1,309,735 | Henig | July 15, 1919 |
| 1,385,161 | Thornton | July 19, 1921 |
| 1,949,225 | Van Lammeren | Feb. 27, 1934 |
| 2,180,352 | Fahrney | Nov. 21, 1939 |
| 2,608,960 | Kunz | Sept. 2, 1952 |